United States Patent
Nagatomo

(10) Patent No.: US 8,706,057 B2
(45) Date of Patent: Apr. 22, 2014

(54) IN-VEHICLE DEVICE AND DELIVERY SYSTEM

(75) Inventor: Hideyuki Nagatomo, Kawasaki (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 165 days.

(21) Appl. No.: 12/670,655

(22) PCT Filed: Jul. 25, 2008

(86) PCT No.: PCT/JP2008/063357
§ 371 (c)(1),
(2), (4) Date: Jan. 26, 2010

(87) PCT Pub. No.: WO2009/019994
PCT Pub. Date: Feb. 12, 2009

(65) Prior Publication Data
US 2010/0190454 A1 Jul. 29, 2010

(30) Foreign Application Priority Data
Aug. 3, 2007 (JP) ................................. 2007-202892

(51) Int. Cl.
*H04B 1/38* (2006.01)
*G08G 1/0967* (2006.01)

(52) U.S. Cl.
CPC ................................. *G08G 1/096716* (2013.01)
USPC ....................................................... 455/90.1

(58) Field of Classification Search
CPC ............. G01C 21/26; G08G 1/096716; G08G 1/096741; G08G 1/096775
USPC ......... 455/41.1, 41.2, 41.3, 66.1, 90.1, 412.1, 455/456.1; 340/425.5; 235/379, 380, 381, 235/383; 701/200, 201, 213
See application file for complete search history.

(56) References Cited

U.S. PATENT DOCUMENTS

| 7,161,464 B2 | 1/2007 | Yuhara | |
| 7,528,722 B2 * | 5/2009 | Nelson | ........................ 340/572.1 |

(Continued)

FOREIGN PATENT DOCUMENTS

| CA | 2 405 060 | 10/2001 |
| CN | 1522903 | 8/2004 |

(Continued)

OTHER PUBLICATIONS

Notification of Transmittal of Translation of the International Preliminary Report on Patentability (Application No. PCT/JP2008/063357) dated Mar. 4, 2010.

(Continued)

*Primary Examiner* — David Bilodeau
(74) *Attorney, Agent, or Firm* — Eric J. Robinson; Robinson Intellectual Property Law Office, P.C.

(57) ABSTRACT

When notification information about a company code is received from a center device, a control unit of an in-vehicle device refers to uplink information which is generated for each qualified delivery company and stored in a storage unit and cross-checks the company code included in the uplink information with the received company code (step S8). Only when those are identical, the uplink information corresponding to the company code to which it is judged that those are identical is read out from the storage unit and written in an uplink information storage area of the storage unit of a DSRC unit (step S9). Security on content information delivery is improved.

15 Claims, 5 Drawing Sheets

(56) References Cited

U.S. PATENT DOCUMENTS

| | | | |
|---|---|---|---|
| 7,636,626 B2 * | 12/2009 | Oesterling et al. | 701/34.4 |
| 7,974,615 B2 * | 7/2011 | Talty et al. | 455/422.1 |
| 2002/0045456 A1 | 4/2002 | Obradovich | |
| 2004/0145447 A1 | 7/2004 | Yuhara | |
| 2007/0106467 A1 | 5/2007 | Sumizawa et al. | |
| 2008/0150707 A1 * | 6/2008 | Shamoto | 340/425.5 |
| 2008/0249889 A1 * | 10/2008 | Kawakami | 705/26 |
| 2009/0299857 A1 * | 12/2009 | Brubaker | 705/14.66 |
| 2010/0121703 A1 * | 5/2010 | Goto et al. | 705/14.41 |

FOREIGN PATENT DOCUMENTS

| | | |
|---|---|---|
| CN | 1770207 | 5/2006 |
| CN | 101165723 | 4/2008 |
| DE | 601 31 157 | 8/2008 |
| EP | 1 279 305 | 10/2007 |
| JP | 2003-296358 | 10/2003 |
| JP | 2003-530793 | 10/2003 |
| JP | 2004-310301 | 11/2004 |
| JP | 2004-320570 | 11/2004 |
| JP | 2007-114027 | 5/2007 |
| JP | 2007-124607 | 5/2007 |
| JP | 2007-132747 | 5/2007 |
| WO | 01/78427 | 10/2001 |

OTHER PUBLICATIONS

International Search Report for PCT/JP2008/063357.
Supplementary European Search Report (Application No. 08791601.1) dated Aug. 17, 2011.
Chinese Office Action (Application No. 200880101861.1) dated Nov. 20, 2012.

* cited by examiner

IN-VEHICLE DEVICE AND DELIVERY SYSTEM

TECHNICAL FIELD

The present invention relates to an in-vehicle device and a delivery system used to deliver content information.

BACKGROUND ART

Conventionally, an in-vehicle device such as a navigation device can use DSRC (Dedicated Short Range Communication) and the like to perform narrow area wireless communication with a road side device arranged on the road and receive information provided from a center device through the road side device (see, for example, Patent Documents 1 and 2). More specifically, two-way communication is possible between the in-vehicle device of a car and the road side device only when the car is within the communication range of the road side device, and during that time, the center device delivers a variety of content information, such as advertisement information, through the road side device.

Patent Document 1: Japanese Patent Application Laid-Open No. 2001-101578
Patent Document 2: Japanese Patent Application Laid-Open No. 2004-279509

DISCLOSURE OF THE INVENTION

Problems to be Solved by the Invention

In the delivery of the content information, information related to the delivery of the content information, such as user's taste and advertisements that have been viewed, is provided to the center device to adjust the content of the delivered information for the user in the car as much as possible. Specifically, a specific storage area is arranged in a memory and the like of the in-vehicle device, and the information related to the delivery of the content information is written in. The center device can access the information in the area to acquire the information related to the delivery of the content information. Based on the acquired information, the center device organizes and delivers content information suitable for the user in the car.

Conventionally, there are a plurality of delivery companies of content information, and a center device of any of the delivery companies can access the specific storage area of the in-vehicle device.

However, the information related to the delivery of the content information may also be personal information of the user, and the configuration that allows limitless accesses is not preferable in terms of security.

An object of the present invention is to improve the security in the delivery of content information. The present invention can provide an in-vehicle device and a delivery system that can appropriately deliver the content information while sufficiently assuring the security.

Means for Solving the Problems

A first aspect of the present invention provides an in-vehicle device suitable for content delivery.

Basically, the in-vehicle device comprises: communication means for communicating with a center device that delivers content information through a road side device; storage means including a storage area for storing information to be provided to the center device; and control means for determining whether a delivery company is a qualified delivery company based on specific information of the delivery company if the specific information of the delivery company of the content information is received from the center device through the communication means, and when determining that the delivery company is a qualified delivery company, writing uplink information related to the delivery of the content information in the storage area.

Preferably, if there are a plurality of qualified delivery companies, the control means operates to write the uplink information corresponding to the received specific information of the delivery company in the storage area.

Preferably, if the delivery of the content information from the center device has ceased for a constant time, the control means operates to delete the uplink information written in the storage area.

Preferably, if request information of deletion of the uplink information is received from the center device through the communication means, the control means operates to delete the uplink information written in the storage area.

Preferably, if the communication means transmits the uplink information written in the storage area to the center device, the control means operates to delete the uplink information from the storage area.

Preferably, if the communication by the communication means with the road side device has ceased for a constant time, the control means operates to delete the uplink information written in the storage area.

A second aspect of the present invention provides a delivery system including a center device that delivers content information and an in-vehicle device.

The in-vehicle device included in the delivery system according to the present invention comprises: communication means for communicating with the center device through a road side device; storage means including a storage area for storing information to be provided to the center device; and control means, wherein the control means operates to determine whether a delivery company is a qualified delivery company based on specific information of the delivery company if the specific information of the delivery company of the content information is received from the center device through the communication means, and when determining that the delivery company is a qualified delivery company, write uplink information related to the delivery of the content information in the storage area.

Effects of the Invention

According to the inventions of claims 1 and 7, the uplink information is written in when it is determined that the delivery company is a qualified delivery company, and the uplink information can be read out. This can prevent a third party not in the qualified company to unlimitedly read out the uplink information and can improve the security in the delivery of the content information.

According to the invention of claim 2, the uplink information of a certain delivery company can be prevented from being read out by other delivery companies even among the qualified delivery companies, and the security can be further improved.

According to the inventions of claims 3 to 6, the deletion of the uplink information can prevent a third party from unlimitedly reading out the uplink information.

| Description of Symbols | |
|---|---|
| 100 | delivery system |
| 10 | in-vehicle device |
| 1 | car navigation unit |
| 1d | input unit |
| 1e | display unit |
| 1f | storage unit |
| 3 | DSRC unit |
| 3a | DSRC control unit |
| 3b | communication unit |
| 3c | storage unit |
| M | uplink information storage area |
| 4 | control unit |
| 20 | road side device |
| 30 | center device |

BEST MODES FOR CARRYING OUT THE INVENTION

First, configurations will be described.

Figure 1:
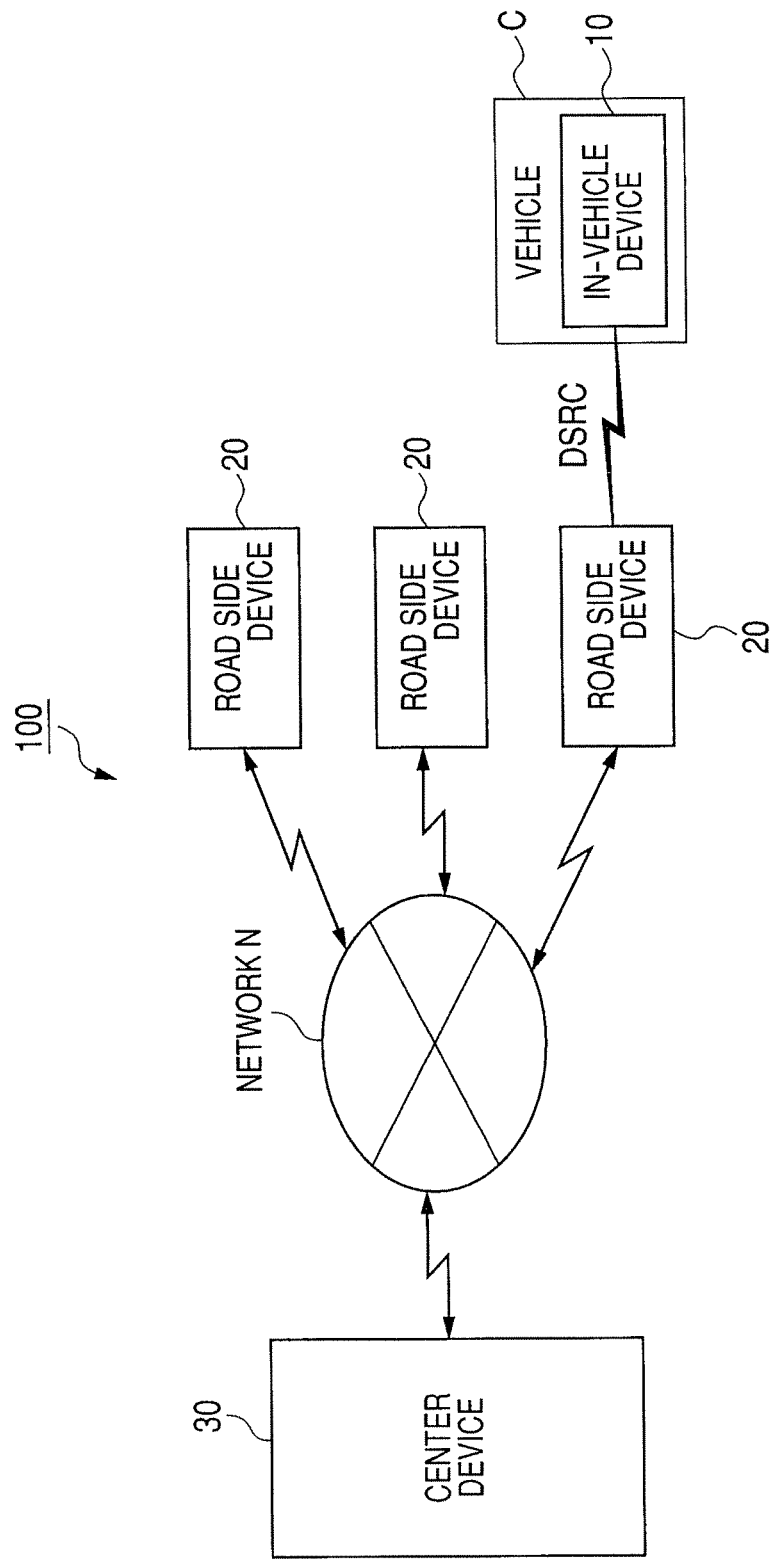
FIG. 1 is a diagram showing a system configuration of a delivery system according to the present embodiment.

FIG. 1 shows a system configuration of a delivery system 100 including an in-vehicle device according to the present embodiment.

As shown in FIG. 1, the delivery system 100 comprises an in-vehicle device 10 mounted on a vehicle C, road side devices 20, and a center device 30, and the center device 30 delivers content information to the in-vehicle device 10 through the road side devices 20. The content information is, for example, text information, image information, sound information, and the like provided to the user, and examples of the contents include various contents, such as advertisements of shops, guides of parking areas and medical facilities, and the like.

There are a plurality of road side devices 20 arranged on the road, parking areas, and the like, and the road side devices 20 are connected to the center device 30 through a network N. The road side devices and the in-vehicle device 10 of the vehicle C traveling on the road can wirelessly communicate.

Hereinafter, the configuration apparatuses will be described in detail.

The center device 30 stores content information and delivers the content information to the in-vehicle device 10. A computer terminal and the like comprising a control unit that controls the delivery, a communication unit that communicates with the road side devices 20, and a storage unit that stores the content information can be applied as the center device 30.

Although only one center device 30 is illustrated in FIG. 1, there are a plurality of delivery companies that deliver the content information, and the center device 30 is provided to each delivery company.

The center device 30 stores company codes individually provided to the delivery companies of the content information. The users register as members when making contracts to subscribe to the delivery services of the content information, and for each user, the center device 30 compiles a database and stores specific information, such as name and address of the user registered as a member, as well as information, such as in-vehicle device ID of the in-vehicle device 10 occupied by the user.

Figure 2:
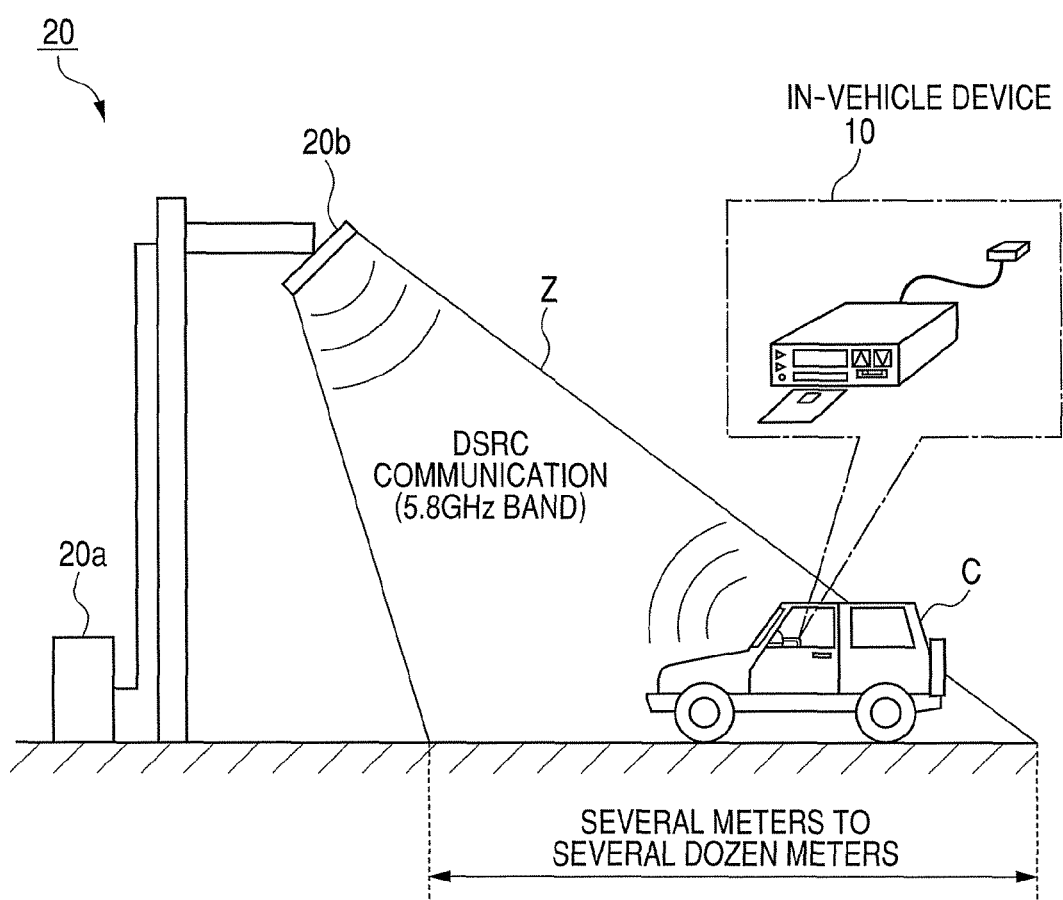
FIG. 2 is a diagram for explaining a road side area of a road side device of FIG. 1.

As shown in FIG. 2, the road side device 20 is constituted by a main body device 20a and an antenna 20b. The road side device 20 emits a DSRC radio wave with limited range from the antenna 20b arranged on the side of the road or above the road to form a road side area Z near the road side device 20. Two-way narrow area wireless communication is possible only with the in-vehicle device 10 of the vehicle C in the road side area Z. Hereinafter, the narrow area wireless communication between the road side device 20 and the in-vehicle device 10 may be called road-to-vehicle communication.

The DSRC is a communication system using a radio wave of a 5.8 GHz band, and the communication range is, for example, several meters to several dozen meters. Since the transmission outputs of DSRC from the road side devices 20 are set to about the same level, the road side areas Z formed by the plurality of road side devices 20 are substantially constant regardless of the installation location.

The main body device 20a executes a process of intermediating exchange of information between the in-vehicle device 10 and the center device 30. More specifically, the main body device 20a transfers information received from the in-vehicle device 10 through the antenna 20b to the center device 30 and transfers the content information transmitted from the center device 30 to the in-vehicle device 10. A computer terminal comprising a control unit that performs information processing and communication control, a storage unit, and the like can be applied as the main body device 20a.

The in-vehicle device 10 is mounted on the vehicle C and has functions, such as a navigation function for executing a process of leading to a guide path and the like and a function for executing a process of using ETC (Electronic Toll Collection System) based on DSRC.

Figure 3:
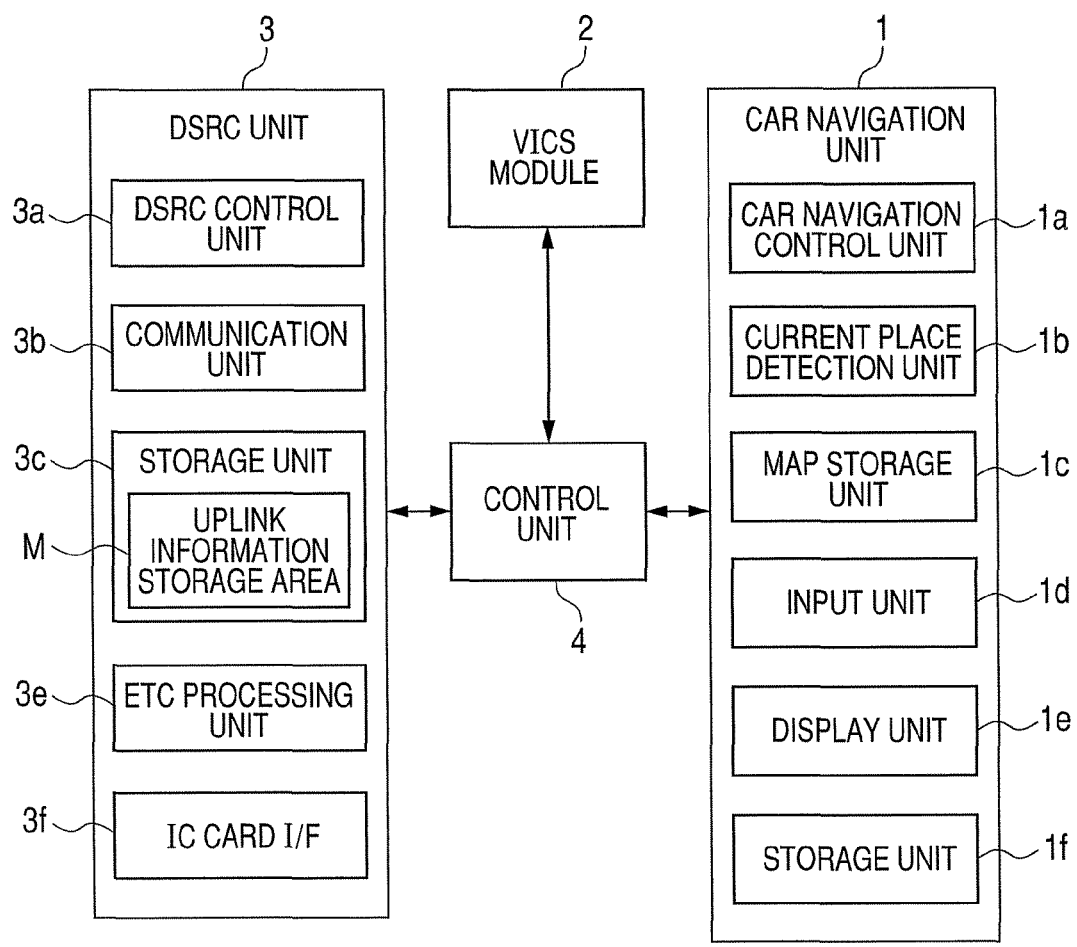
FIG. 3 is a diagram showing a functional configuration of an in-vehicle device of FIG. 1.

As shown in FIG. 3, the in-vehicle device 10 comprises a car navigation unit 1, a VICS module 2, a DSRC unit 3, and a control unit 4.

The control unit 4 is constituted by a CPU (Central Processing Unit), a RAM (Random Access Memory), and the like. In collaboration with a control program stored in a storage unit 1f, the control unit 4 performs various calculations and collectively controls the components.

For example, the control unit 4 controls the communication operation of the DSRC unit 3 in the road-to-vehicle communication with the road side device 20. The control unit 4 controls the DSRC unit 3 in collaboration with a DSRC control unit 3a of the DSRC unit 3. The control unit 4 further stores the content information received from the center device 30 through the DSRC unit 3, controls the display, and the like.

The car navigation unit 1 comprises a car navigation control unit 1a, a current place detection unit 1b, a map storage unit 1c, an input unit 1d, a display unit 1e, the storage unit 1f, and the like and executes a process for leading the vehicle C to the guide path.

The car navigation control unit 1a calculates the guide path from the current place of the vehicle C to the destination set through the input unit 1d based on information of the current place acquired from the current place detection unit 1b, map information stored in the map storage unit 1c, and the like. The car navigation control unit 1a then uses the map information stored in the map storage unit is to generate a map screen for leading to the calculated guide path and displays the map screen on the display unit 1e.

The current place detection unit 1b comprises various sensors, such as a GPS antenna, an angle sensor, a direction sensor, and a distance sensor, and detects the current place of the vehicle C based on the detection result of the sensors. The GPS antenna detects a GPS signal transmitted from a GPS satellite. The angle sensor detects the acceleration of car (speed of rotation in the horizontal direction per unit time) indicating the amount of change in the moving direction, and the direction sensor detects the terrestrial magnetism to detect the absolute direction of vehicle. The current place detection unit 1b generates current place information (information of longitude, latitude, and the like) indicating the current place of vehicle based on the detection results acquired from the sensors and outputs the information to the car navigation control unit 1a.

The map storage unit 1c is constituted by a recording medium, such as a memory and a DVD, and stores map information necessary to display the guide, guide information (road information, congestion information, and the like) received through the VICS module 2, and the like.

The input unit 1d is constituted by a touch panel and the like integrally constituted by operation keys and the display unit 1e. The input unit 1d generates operation signals corresponding to the operations and outputs the signals to a control unit 31.

The display unit 1e comprises a monitor and displays a variety of information on the monitor in accordance with the control of the control unit 4. Examples of the information include a setting screen, a map screen, and a display screen of the content information received from the center device 10.

The storage unit 1f is constituted by a memory and stores control programs executed by the control unit 4 and the car navigation control unit 1a as well as parameters and data required to execute the programs. The storage unit 1f also stores uplink information to be provided to the center device 30 and stores the content information received from the center device 30. If there are a plurality of delivery companies with which the user has contracted for the delivery of content information (hereinafter called "qualified delivery companies"), the control unit 4 generates the uplink information including contents corresponding to the delivery companies, and the storage unit 1f stores the uplink information. The control unit 4 always updates the uplink information so that the latest contents are included, and the storage unit 1f stores the information. Details of the uplink information will be described later.

The VICS module 2 comprises antennas for optical communication, for FM communication, and for 2.4 GHz radio wave communication and performs optical communication, FM communication, and radio wave communication with a VICS center. The VICS module 2 receives congestion information, road traffic information, and the like from the VICS center and outputs the information to the control unit 31.

The DSRC unit 3 executes a process for using ETC based on DSRC, a communication process for receiving content information from the center device 30, and the like.

As shown in FIG. 3, the DSRC unit 3 comprises the DSRC control unit 3a, a communication unit 3b, a storage unit 3c, an ETC processing unit 3e, and an IC card I/F 3f.

The DSRC control unit 3a is constituted by a CPU, a RAM, and the like and controls operations of the components of the DSRC unit 3 in collaboration with control programs stored in the storage unit 3c.

For example, in the payment by ETC, the DSRC control unit 3a controls the communication operation of the communication unit 3b to transmit and receive payment information to and from an ETC base station (wireless base station arranged near an ETC gate and the like for ETC payment). The DSRC control unit 3a also causes the ETC processing unit 3e to execute a writing process of the payment information.

In the reception of the content information from the center device 30, the DSRC control unit 3a causes the communication unit 3b to transmit information stored in an uplink information storage area M of the storage unit 3c to the road side device 20 in accordance with an instruction of the control unit 4 and outputs the content information to the control unit 4 when the communication unit 3b receives the content information through the road side device 20.

The communication unit 3b comprises an antenna fixed on the dashboard of the vehicle C, near the windshield, and transmits and receives DSRC radio waves to and from the road side device 20, the ETC base station, and the like through the antenna.

The storage unit 3c stores a control program and the like executed by the DSRC control unit 3a.

Figure 4:
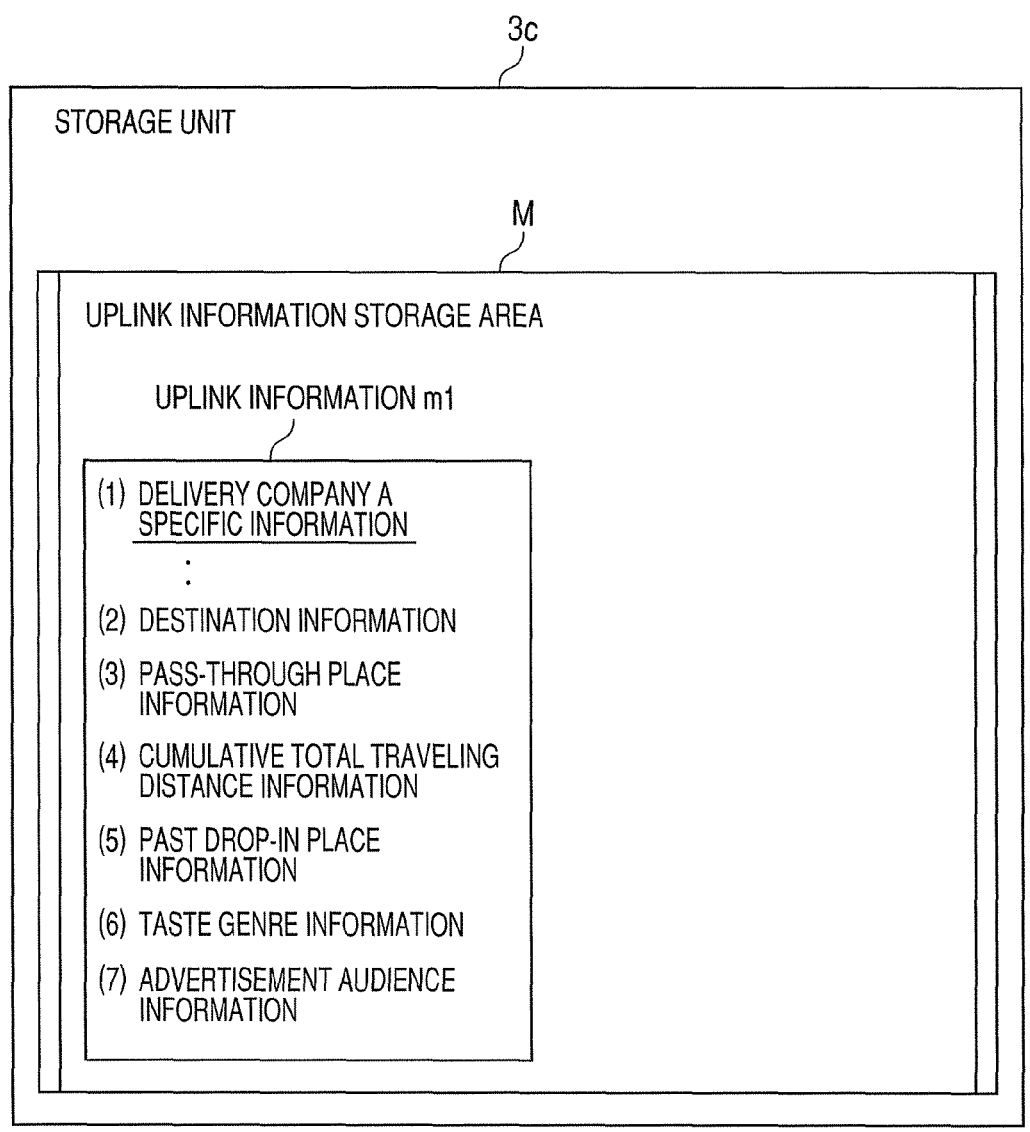
FIG. 4 is a diagram showing an example of uplink information stored in an uplink information storage area.

The storage unit 3c also includes the uplink information storage area M. As shown in FIG. 4, the uplink information storage area M is a storage area specially arranged for providing information to the center device 30, and uplink information ml shown in FIG. 4 as well as characteristic information (not shown) of the in-vehicle device 10 are stored.

The characteristic information is information related to device characteristics of the in-vehicle device 10. The characteristic information includes information, such as an in-vehicle device ID of the in-vehicle device 10, a language that the in-vehicle device 10 can accommodate, a geodetic system of map, a copyright management technique, resolution of the display of the display unit 1e, correspondence to SVG (Scalable Vector Graphics), and memory capacity of the content information that can be stored. The in-vehicle device ID is identification information specific to the in-vehicle device 10.

The uplink information is information helpful for the center device 30 to determine what kind of content information will be delivered. The uplink information includes specific information of delivery company, destination information of the vehicle C, pass-through place information, cumulative total traveling distance information, past drop-in place information, taste genre information of the user, advertisement audience history information, and the like.

The specific information of delivery company is information for specifying the delivery company with which the user has contracted in advance for the delivery of content information and is, for example, a company code and a company name.

The destination information of the vehicle C is information of latitude and longitude of the destination set in the car navigation unit 1, and the pass-through place information is information of latitudes and longitudes of places to be passed through in the lead path to the destination set in the car navigation unit 1. The cumulative total traveling distance information is information of the cumulative total traveling distance of the vehicle C from the start point to the current place, and the past drop-in place information is information of latitudes and longitudes of places that the vehicle C has stopped in the past (thus, places where the power of the in-vehicle device 10 is turned on or off) and time information.

The taste genre information is information of a genre set by the user among the genres prepared by the delivery company. For example, if the user sets gourmet when genres such as shopping, gourmet, and life are prepared, information of the genre of gourmet is stored.

The advertisement audience information is an information code of advertisement information actually played back by, for example, being displayed on the display unit 1e and time information of the playback among the information codes of advertisement information delivered from the center device 30 and the advertisement information.

The ETC processing unit 3e reads and writes payment information and the like of a credit card with IC, a debit card, or the like plugged into the IC card I/F 3f.

The IC card I/F 3f comprises a slot of the credit card or the like and intermediates exchange of information between the IC of the credit card or the like inserted into the slot and the ETC processing unit 3e.

Next, operations will be described.

Figure 5:
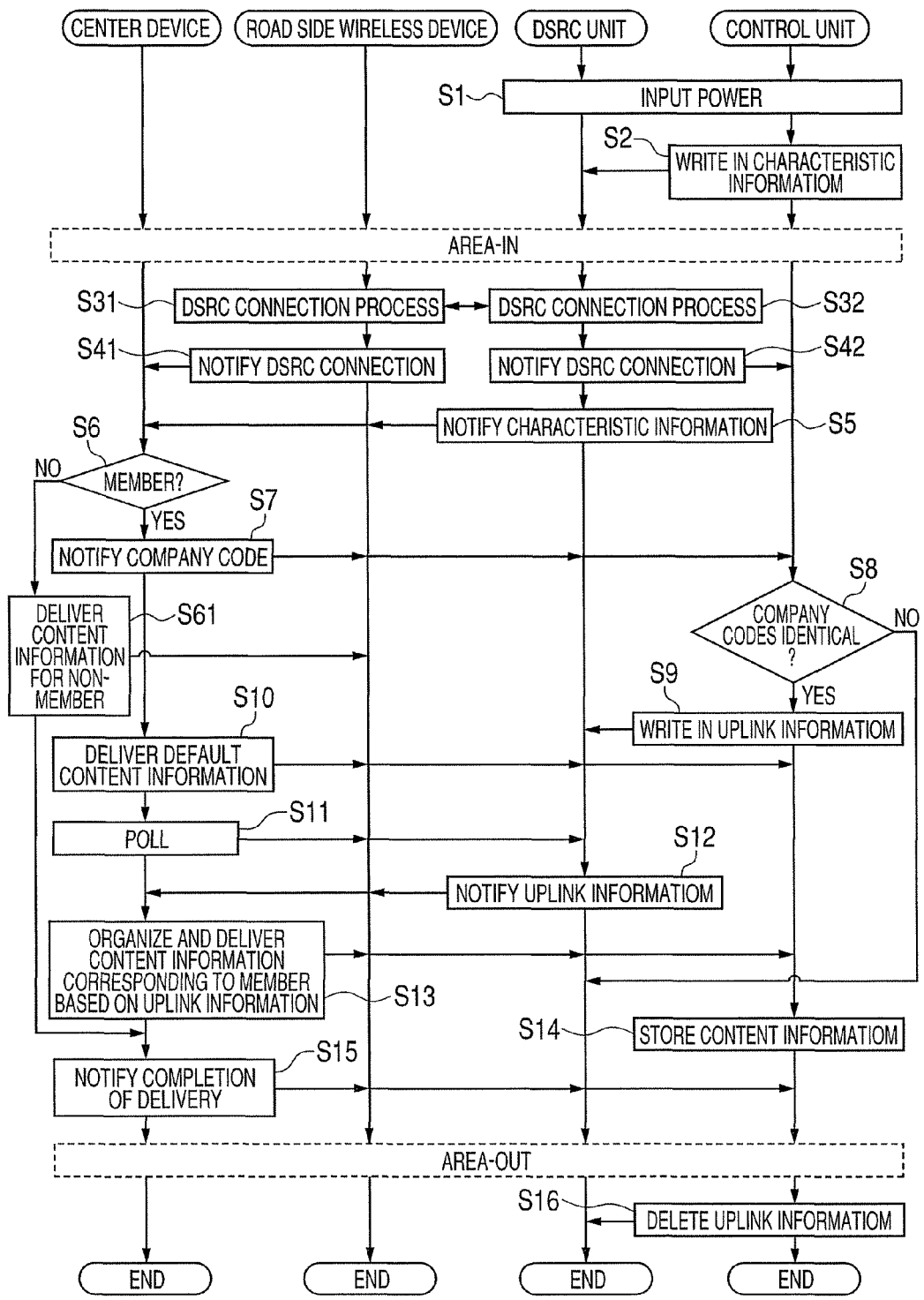
FIG. 5 is a diagram for explaining a flow of a process in the delivery system.

FIG. 5 is a flow chart for explaining a flow of processes by the devices, the center device 30, the road side device 20, and the in-vehicle device 10, to deliver the content information.

As shown in FIG. 5, when the engine of the vehicle C is activated and the power of the in-vehicle device 10 is inputted (step S1), the control unit 4 generates the characteristic information of the in-vehicle device 10 and writes the characteristic information in the uplink information storage area M of the storage unit 3c (step S2). The control unit 4 inquires the components, such as the display unit 1e, for items determined in advance by the center device 30 or reads out information stored in the storage unit 1f to acquire the characteristic information. The control unit 4 then encodes the acquired information and writes the code in a corresponding area of the uplink information storage area M (see FIG. 4). In practice, control information for instructing writing is outputted to the DSRC control unit 3a, and the DSRC control unit 3a writes the code in the uplink information storage area M.

Subsequently, when the vehicle C starts traveling and enters the road side area Z of the road side device 20 (area-in), the road side device 20 detects the vehicle C and starts a connection process with the DSRC unit 3 of the in-vehicle device 10 by DSRC communication (steps S31 and S32). More specifically, the road side device 20 sends out a DSRC radio wave, and if a response is obtained from the in-vehicle device 10, establishes the communication path. After establishing the communication path, the road side device 20 transmits notification information, indicating the completion of connection, to the center device 30 (step S41). Meanwhile, the DSRC unit 3 of the in-vehicle device 10 outputs the notification information, indicating the completion of connection, to the control unit 4 (step S42).

Next, when the road side device 20 requests the DSRC unit 3 of the in-vehicle device 10 to transmit information in the uplink information storage area M, the DSRC unit 3 transmits the characteristic information written in the uplink information storage area M to the road side device 20 (step S5). The characteristic information is transmitted to the center device 30 through the road side device 20.

The center device 30 determines whether the user of the in-vehicle device 10 is a member of the delivery service based on the in-vehicle device ID included in the received characteristic information (step S6).

If the center device 30 determines that there is no in-vehicle device ID among the in-vehicle device IDs of all members of delivery services registered in the member database that is identical to the received in-vehicle device ID so that the user is a non-member (step S6; N), the center device 30 transmits content information for non-member to the in-vehicle device 10 through the road side device 20 (step S61). The content information for non-member is information for the public such as public advertisement information including delay information of train, tax payment notification information, or the like. The in-vehicle device 10 stores the content information in the storage unit 1f (step S14).

On the other hand, if there is an identical in-vehicle device ID, the center device 30 determines that the user is a member (step S6; Y) and transmits notification information of the company code of the delivery company to the road side device 20 (step S7).

When the notification information of the company code is received through the road side device 20, the control unit 4 of the in-vehicle device 10 compares the company codes included in the uplink information stored in the storage unit 1f and the notified company code (step S8). If there is an identical company code (step S8; Y), the control unit 4 determines that the delivery company with the received company code is a qualified company code, reads out the uplink information corresponding to the company code from the storage unit 1f, and writes the uplink information in the uplink information storage area M (step S9). As described, since the control unit 4 generates and updates the uplink information according to the delivery companies, the content corresponds to the delivery companies, and the content is the latest.

Meanwhile, the center device 30 delivers default content information to the in-vehicle device 10 through the road side device 20 (step S10). Like the content information for non-member, the default content information is information including content for the public such as public advertisement information. The in-vehicle device 10 stores the content information delivered to the storage unit 1f.

The center device 30 periodically polls the in-vehicle device 10 (step S11) and requests for the uplink information written in the uplink information storage area M.

When the control unit 4 writes in the uplink information, the DSRC unit 3 transmits the uplink information stored in the uplink information storage area M to the center device 30 through the road side device 20 in accordance with the polling from the center device 30 (step S12).

Based on the transmitted uplink information, the center device 30 organizes the content information corresponding to the user in multi-format and delivers the content information to the in-vehicle device 10 through the road side device 20 (step S13). The multi-format is a format preset for the delivery of the content information, and items, codes, and the like of the information to be delivered are defined.

For example, the center device 30 organizes gourmet information around the destination based on the destination information and the taste genre information included in the uplink information or organizes advertisement information of shops where oil change or the like is possible based on the total traveling distance information.

In the in-vehicle device 10, the control unit 4 stores the received content information in the storage unit 1f (step S14). When there is a display instruction later or when the vehicle reaches the place where the information should be displayed, the control unit 4 controls the display to sequentially display the stored content information on the display unit 1e. If the user is a non-member (step S6; N), only the content information for non-member is stored in the storage unit 1f. If the company code is not identical (step S8; N), only the default content information is stored.

Subsequently, after delivering all content information that should be delivered, the center device 30 transmits message information for notifying the completion of delivery to the in-vehicle device 10 through the road side device 20 (step S15). The message information of the completion of delivery is information for prompting the user to move out of the area. Subsequently, when the delivery of content information from the center device 30 ceases for a constant time, the control unit 4 of the in-vehicle device 10 determines that the delivery is completed and controls the DSRC control unit 3a to delete the uplink information in the uplink information storage area M (step S16).

As described, according to the present embodiment, the uplink information is not unconditionally written in the uplink information storage area M. The uplink information is written when the company code of a qualified delivery company and the company code transmitted from the center device 30 are identical. This can prevent a third party not in the contracted qualified company to unlimitedly read out the uplink information and can improve the security in the delivery of the content information.

If there are a plurality of qualified delivery companies, uplink information corresponding to the delivery company is written. Therefore, other delivery companies cannot easily acquire the uplink information for a certain delivery company, and access to the uplink information can be limited even between the qualified delivery companies. This further improves the security. Preparing the uplink information for each delivery company can optimize the content of the content information.

If it is determined that the delivery of content information from the center device 30 has ceased for a constant time, the written uplink information is deleted. Therefore, the uplink information can be deleted when the delivery of content information is completed, and thereafter, reading out of the uplink information by a third party can be prevented.

The embodiment is a preferred example of the present invention and is not limited to this.

For example, although the control unit 4 of the in-vehicle device 10 determines the completion of delivery of the content information to delete the uplink information, the center device 30 may delete the uplink information. More specifically, the center device 30 transmits request information for deleting the uplink information to the in-vehicle device 10, and after the reception of the request information, the control unit 4 of the in-vehicle device 10 controls to delete the uplink information in the uplink information storage area M. As a result, the uplink information can be deleted at the timing of the completion of reading of the uplink information necessary in the center device 30, and the security can be improved. The user may determine the completion of delivery of the content information to manually delete the uplink information.

Furthermore, the DSRC control unit 3a may delete the uplink information when the DSRC unit 3 transmits the uplink information to the center device 10. The control unit 4 may monitor whether the DSRC communication with the road side device 20 has ceased for a constant time and determine that the vehicle C is moved out of the road side area Z of the road side device 20 (thus, area-out) if the communication has ceased for the constant time to thereby delete the uplink information. In either case, the deletion of the uplink information can prevent reading out by a third party.

Although a company code is used to determine whether the company is a contracted qualified company, the arrangement is not limited to this. Other specific information such as company name may be used to make the determination as long as the company can be specified.

The invention claimed is:

1. An in-vehicle device comprising:

a communication unit adapted to communicate with a center device through a road side device to receive from the center device specific information relating to a delivery company and content information from the delivery company;

a storage unit having a storage area, adapted to store uplink information to be provided to the center device that is related to delivery of the content information; and a control unit adapted to perform a control operation of storing the uplink information in the storage area only if received specific information relating to the delivery company matches specific criteria, wherein the control unit performs the control operation of deleting the uplink information stored in the storage area after a predetermined operation, and wherein if the communication unit receives request information from the center device requesting deletion of the uplink information, the control unit operates to delete the uplink information stored in the storage area.

2. The in-vehicle device according to claim 1, wherein if there is a plurality of predetermined delivery companies, the control unit operates to store the uplink information corresponding to the received specific information of the delivery company in the storage area.

3. The in-vehicle device according to claim 1, wherein if delivery of the content information from the center device has ceased for a predetermined period of time, the control unit operates to delete the uplink information stored in the storage area.

4. The in-vehicle device according to claim 1, wherein if the communication unit transmits the uplink information stored in the storage area to the center device, the control unit operates to delete the uplink information from the storage area.

5. The in-vehicle device according to claim 1, wherein if communication by the communication unit with the road side device has ceased for a predetermined period of time, the control unit operates to delete the uplink information stored in the storage area.

6. The in-vehicle device according to claim 1, wherein the delivery company is determined to be a match if it is a contracted delivery company.

7. A delivery system comprising a center device for delivering content information and an in-vehicle device, the in-vehicle device comprising:

a communication unit adapted to communicate with the center device through a road side device to receive from the center device specific information relating to a delivery company and content information from the delivery company;

a storage unit having a storage area, adapted to store uplink information to be provided to the center device that is related to delivery of the content information; and a control unit adapted to operate to store the uplink information in the storage area only if received specific information relating to the delivery company matches specific criteria, wherein the control unit operates to delete the uplink information stored in the storage area after a predetermined operation, and wherein if the communication unit receives request information from the center device requesting deletion of the uplink information, the control unit operates to delete the uplink information stored in the storage area.

8. The in-vehicle device according to claim 2, wherein if delivery of the content information from the center device has ceased for a predetermined period of time, the control unit operates to delete the uplink information stored in the storage area.

9. The in-vehicle device according to claim 2, wherein if the communication unit transmits the uplink information stored in the storage area to the center device, the control unit operates to delete the uplink information from the storage area.

10. The in-vehicle device according to claim 2, wherein if communication by the communication unit with the road side device has ceased for a predetermined period of time, the control unit operates to delete the uplink information stored in the storage area.

11. The delivery system according to claim 7, wherein if there is a plurality of predetermined delivery companies, the control unit operates to store the uplink information corresponding to the received specific information of the delivery company in the storage area.

12. The delivery system according to claim 7, wherein if delivery of the content information from the center device has ceased for a predetermined period of time, the control unit operates to delete the uplink information stored in the storage area.

13. The delivery system according to claim 7, wherein if the communication unit transmits the uplink information stored in the storage area to the center device, the control unit operates to delete the uplink information from the storage area.

14. The delivery system according to claim 7, wherein if communication by the communication unit with the road side device has ceased for a predetermined period of time, the control unit operates to delete the uplink information stored in the storage area.

15. The delivery system according to claim 7, wherein the delivery company is determined to be a match if it is a contracted delivery company.

* * * * *